United States Patent [19]

Boss et al.

[11] 3,815,101

[45] June 4, 1974

[54] PROCESSOR STATE AND STORAGE LIMITS REGISTER AUTO-SWITCH

[75] Inventors: Garold D. Boss, Cottage Grove, Minn.; Vaemond H. Crane, Audubon; Donald G. McBeath, Furlong, both of Pa.; Martin D. Thompson, Burnsville, Minn.

[73] Assignee: Sperry Rand Corporation, New York, N.Y.

[22] Filed: Nov. 8, 1972

[21] Appl. No.: 304,696

[52] U.S. Cl. .............................................. 340/172.5

[51] Int. Cl. .......................... G06f 9/20, G06f 11/00

[58] Field of Search .................................. 340/172.5

[56] References Cited

UNITED STATES PATENTS

| | | | |
|---|---|---|---|
| 3,389,380 | 6/1968 | Ashbaugh et al. | 340/172.5 |
| 3,461,433 | 8/1969 | Emerson | 340/172.5 |
| 3,573,855 | 4/1971 | Cragon et al. | 340/172.5 |
| 3,594,732 | 7/1971 | Mendelson et al. | 340/172.5 |
| 3,644,900 | 2/1972 | Mizoguchi | 340/172.5 |
| 3,699,528 | 10/1972 | Carlson et al. | 340/172.5 |
| 3,725,874 | 4/1973 | Van Heel | 340/172.5 |
| 3,731,283 | 5/1973 | Carlson et al. | 340/172.5 |
| 3,737,860 | 6/1973 | Sporer | 340/172.5 |
| 3,742,458 | 6/1973 | Inoue et al. | 340/172.5 |

*Primary Examiner*—Paul J. Henon
*Assistant Examiner*—Jan E. Rhoads
*Attorney, Agent, or Firm*—Kenneth T. Grace; Kenneth J. Grace; John P. Dority

[57] ABSTRACT

A means for automatically changing from a first to a second processor state register (PSR) when the relative address represented by the base value contained in the first of the PSR's does not fall within first predetermined limits. Logic means respond to such limits test failure to automatically switch active PSR's and recompute the absolute address using the base value contained in the other second PSR, followed by another limits test using second predetermined limits. When both limits tests fail a guard mode bit is tested which, if clear, will permit execution of the instruction outside the predetermined limits. When a jump instruction is involved, the switch of PSR's is made permanent until the occurrence of the next jump instruction requiring an automatic switching of PSR's.

8 Claims, 8 Drawing Figures

FIG. 1

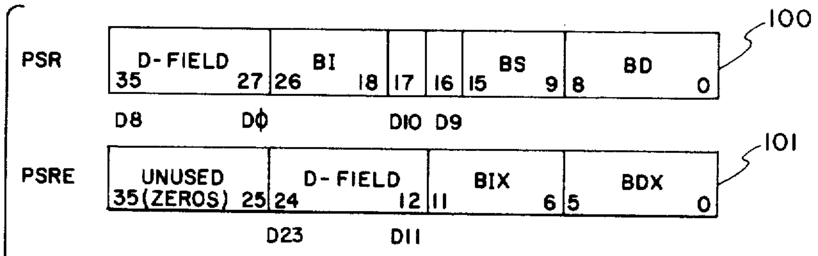

PSR - FIRST WORD OF MAIN PSR
PSRE - SECOND WORD (EXTENSION PORTION) OF MAIN PSR
D-FIELD - LOCATION OF CONTROL BITS DΦ THROUGH D8
BI - INSTRUCTION BANK BASE VALUE....BD - DATA BANK BASE VALUE
BS - BASE SELECTION VALUE
D2 - GUARD MODE AND STORAGE PROTECTION
D11 - OPERAND BASE SELECTOR. IF "0" USE BI, BD, BS FROM PSR AND PSRE. IF "1" AND I ARE "1" - FORCE USE OF BI, BD, BS FROM PSRU AND PSRUE. THE JUMP OPERAND IS EXCLUDED.
D12 - PSR SLR SELECTOR (PSRU, PSRUE AND SLRU IF SET; PSR, PSRE AND SLR IF CLEAR)
D18 - PSR AND STORAGE LIMITS REGISTER AUTO-SWITCH ON NON JUMP INST. (D12 = Φ AND D18 = 1, AND LIMIT ERROR CONDITION) USE PSRU ON NEXT INST. ONLY.
ON JUMP INST. - (D12 = Φ AND D18 = 1 AND LIMIT ERROR CONDITION) SET D12 WHICH GIVES PERMANENT SWITCH.
BIX - 6-BIT EXTENSION VALUE FOR BI
BDX - 6-BIT EXTENSION VALUE FOR BD

FIG. 2

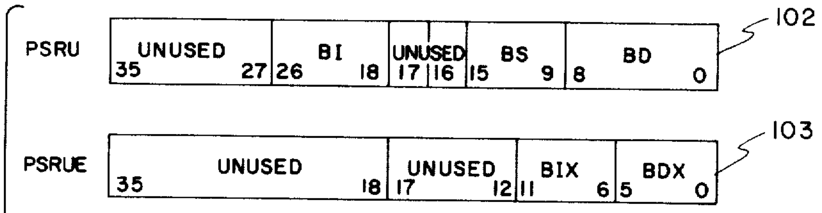

PSRU - UTILITY PROCESSOR STATE REGISTER FIRST WORD
PSRUE - SECOND WORD (EXTENSION PORTION) OF PSRU
BS - BASE SELECTION REGISTER
BI - I BANK BASE
BD - D BANK BASE
BIX - 6-BIT BI EXTENSION
BDX - 6-BIT BD EXTENSION

FIG. 3

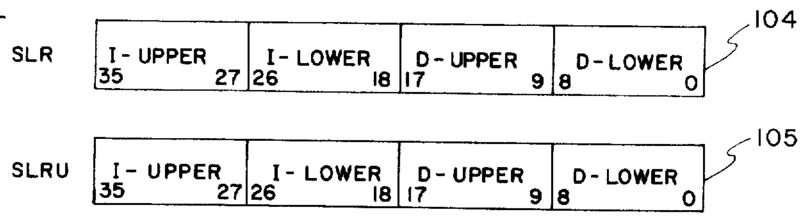

SLR - STORAGE LIMITS REGISTER
SLRU - UTILITY STORAGE LIMITS REGISTER

PROCESSOR STATE AND STORAGE LIMITS REGISTER AUTO-SWITCH

BACKGROUND OF INVENTION

This invention relates generally to the improvement of addressing capabilities of data processor systems employing base relative addressing techniques and having alternate processor state registers (PSR's) and more particularly the invention relates to a means for making the base address mechanisms of both of the alternate processor state registers readily and equally available to the system software.

With the advent of computers that operate at increasingly higher speeds and with increasingly larger capacities, it has become desirable to store a plurality of independently operable programs in the main storage section and to provide an executive conrol program which will cause selected ones of these programs, often referred to as user or worker programs, to be processed for a period of time until it is either completed or it is interrupted for some reason, as for example when accessing some relatively slow peripheral device. Upon interruption of a worker program, the executive program can then proceed to execute a portion of another worker program. This manner of operation is commonly known as time sharing, and results in a greater efficiency in the use of the total computer system. At any given time several worker programs probably will be resident in the main storage of the data processing system, and an even greater number of worker programs will be stored in storage media external to the system.

It has been common practice to store the instruction portions of a program in a continuous segment of storage addresses in main memory, and the operands for the data to be manipulated in another continuous segment of storage locations. The last-mentioned segment of storage locations can, however, be remotely located from the segment of storage locations in which the instructions are stored. While the contents of various storage segments are arbitrary, the disciplines address boundaries of unique segments can vary.

Accordingly, when any given worker program is to be loaded into main memory there is often a problem in finding storage space therefor if the main memory already contains several worker programs utilizing substantial portions of the memory's available storage space in a manner which leaves no long, continous segments of storage locations. More specifically, while there might be many short segments of locations available in-between the various programs stored in main storage, such available space might be insufficient to store either the instruction or data sequences of a new program which it is desired to load into memory.

Solutions for this problem are set forth in U.S. Pat. No. 3,389,380 issued June 18, 1968 to Ashbaugh, et al, entitled "Signal Responsive Apparatus" and in U.S. Pat. No. 3,641,433 issued Aug. 12, 1969 to Emerson and entitled "Relative Addressing System for Memories". The aforementioned systems employ base relative addressing with the ability to change the base address value and thereby move either the instruction sequence or the data sequence of any given worker program from one location to another in main memory. In this manner, programs which are resident in main memory can be shifted about in memory to more efficiently utilize the available storage space.

Such a scheme, however, has certain shortcomings in that the storing of new programs in the allocable space is still limited by the number of worker programs resident in the memory and by the size of the various individual data and instruction sequences of these resident worker programs.

Another limitation of these prior art structures lay in the fact that the base address values were limited to a relatively small area of memory. For example, using an 18 bit access work, the size of the block of main memory within which a program can be relocated is limited to 262,000 words.

A recent development permits a much greater directly accessable storage space by dividing the instruction and data sequence of programs into a plurality of segments, and to store these program segments in various areas in main memory or in extended memory, and then to access each of these memory areas by means of an LIJ or an LDJ type instruction which function generally to change the base address value in the PSR. The changing of the base address values can be effected either by the executive program directly or by the worker or user program without executive control interaction. Details of the aforementioned improvement is set forth in the now abandoned U.S. Pat. application filed Aug. 24, 1972, Ser. No. 283,596 by Garold D. Boss and Martin D. Thompson, and entitled "Extended Addressing System By Program Controlled Changing Of Base Address Values" assigned to the same assignee as this invention, and incorporated herein by reference.

The last mentioned improvement utilzies two processor state registers (PSR's), one defined herein as a main processor state register (PSRM) and a utility processor state register (PSRU). Each of these two processor state registers contains two base values, one known as an instruction bank base value and identified by the nomenclature "BI" and the other known as the data bank base value (BD). With two processor state registers, it is possible for a program to access four separate areas of memory, two with PSR and two with PSRU and with each PSR referencing an instruction bank and a data bank. Only one PSR can be active at any given time to reference storage areas.

When the program requires access to an area of storage not defined by the currently active PSR, but rather defined by the currently inactive PSR, it is then necessary for the software to intervene to change the status of the PSR and to cause the currently inactive PSR to become the active PSR's. A principal reason for switching PSR is that the relative address computed by using the base value in a first PSR failed the storage limits test.

In the prior art systems, the switching from one PSR to the other is not strictly automatic. Software intervention is necessary. Also software overhead is required to maintain records of which groups of instructions and which groups of data are stored in the various segments of memory defined by the base values in the PSR and the PSRU.

It is a primary object of the present invention to provide a hardware means for switching back and forth between the two PSR's without the need for software intervention.

A third purpose of the invention is to provide logic circuitry which utilize the results of a storage limits test failure to automatically switch from the currently active PSR to the currently inactive PSR.

A fourth object of the invention is to provide addressing capabilities which allows the software (instructions and operands) to be broken up into more pieces to thereby provide for fuller utilization of the storage space.

It is a still further object of the invention to provide an addressing capability which allows any software, including the executive program, worker programs or data to be broken up into a plurality of groups, four of which are always immediately and directly addressable by means of the automatically interchangeable PSR's.

BRIEF STATEMENT OF INVENTION

In accordance with the preferred form of the invention, there is provided a first designator bit in the main PSR which designates one of the two PSR's (PSR or PSRU) and a related storage limits register (SLR) as the currently active PSR and SLR. Means are provided for computing the absolute address of the current instruction operand by summing the relative address of the instruction operand and the base address contained in the currently active PSR. Comparator means are then provided for making a sotrage limits test on the relative portion of the operand address. Control logic is provided for responding to the failure of such limits test to toggle the control designator bit to automatically switch PSR's, thereby using the currently inactive PSR as the temporary active PSR in lieu of the heretofor currently active PSR. Whichever PSR is active at any given time is also referred to herein as the primary PSR. The control logic then computes the absolute address of the operand instruction for a second time using the new active PSR, followed by another storage limits test. If the second limits test is positive then the instruction is executed. In response to a failure of the second limits test the control logic causes a "guard mode" designator bit to be examined to determine if execution of the instruction can be permitted, even though the limits test has failed. If not permitted, then the control produces an interrupt control signal for initiating the guard-mode interrupt subroutine.

The control logic further functions to respond to a jump bit indicator to toggle said first designator bit to cause the newly activated PSR, to become the permanent primary PSR until the next automatic switching of PSR's occurs during processing of a jump instruction.

BRIEF DESCRIPTION OF THE DRAWINGS

The above-mentioned and other objects and features of the invention will be more fully understood from the following detailed description of the drawings in which:

FIG. 1 shows the format of the PSRE and PSRU words;

FIG. 2 shows the format of the PSRU and PSRUE words;

FIG. 3 shows the format of the SLR and SLRV words;

DESCRIPTION OF THE INVENTION

Figure 4:
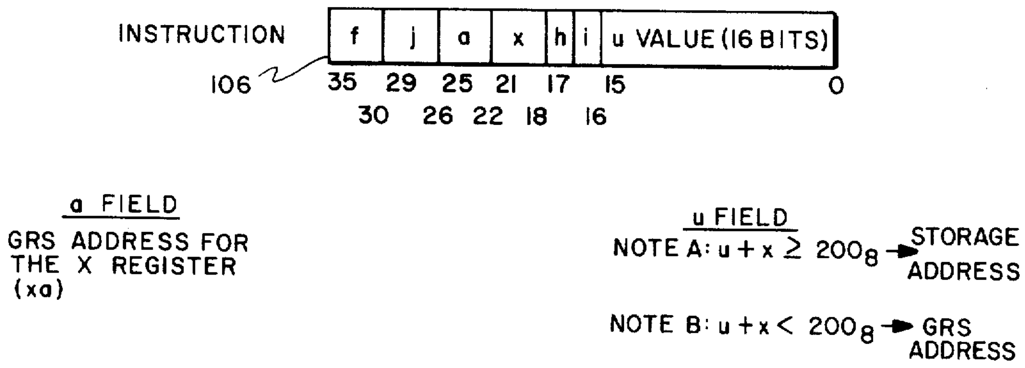
FIG. 4 shows the format of the computer instruction work.

In the following description of this invention it has been necessary to make certain assumptions as to the characteristics of the data processor in which the invention is employed. It is to be understood, however, that these characteristics are assumed only to provide a convenient background in which to describe the invention, which in fact can be utilized in many different types of data processors with only minor adaptations as will be apparent to one skilled in the art. For example, the data processor is assumed to have a word size of 36 bits and two control registers, termed processor state registers and associated with them are two storage limits registers. Other assumptions as to the characteristics of the data processing system will be evident from the following description of the invention. A commercially available data processor having the above features is the UNIVAC 1110 computer manufactured and sold by the Sperry Rand Corporation.

In order to maintain clarity in the description, detailed logic diagrams of the entire computer in which the present invention finds use and detailed timing are not described herein, although a general description of the timing, with a sequential order of operational steps indicated by clock pulses, is set forth.

The description of this invention is organized in the following manner:

I. DESCRIPTION OF WORD FORMATS OF FIGS. 1 – 5
  A. PSR WORD FORMATS OF FIG. 1
  B. PSRU WORD FORMATS OF FIG. 2
  C. SLR WORD FORMATS OF FIG. 3
  D. INSTRUCTION WORD FORMAT OF FIG. 4
  E. WORD FORMATS EMPLOYED IN COMPUTING ABSOLUTE ADDRESSES
II. GENERAL FUNCTIONAL DESCRIPTION OF OPERATION (FIG. 6)
  A. GENERAL DISCUSSION OF FIG. 6
  B. DISCUSSION OF FIRST MAIN LOGIC BRANCH
  C. DISCUSSION OF SECOND MAIN LOGIC BRANCH
III. DESCRIPTION OF IMPLEMENTING LOGIC OF FIG. 7
  A. DESCRIPTION OF LOGIC OF FIG. 7 CORRESPONDING TO FIRST MAIN LOGIC BRANCH.
  B. DESCRIPTION OF LOGIC OF FIG. 7 CORRESPONDING TO SECOND MAIN LOGIC BRANCH.
  C. GENERAL DESCRIPTION OF TIMING CHART OF FIG. 8.

I. DESCRIPTION OF WORD FORMATS OF FIGS 1 – 5

A. THE PSR WORD FORMATS OF FIG. 1

Referring now to FIG. 1 there are shown schematically two 36-bit registers which form the processor state register (PSR). More specifically, a first 36-bit register 100 is identified as the PSR and a second 36-bit register 101 is identified as the PSRE. The second 36-bit register 101 is an adjunct of the main PSR 100 and is utilized to modify the base values contained in PSR 100 so as to allow accessing of an extended range reach the extended portion of addresses. More specifically, the BI and BD fields of PSR work 100 define the instruction and data base values, respectively, within a given capacity word segment of thememory. Assume herein that such capacity is 262,000 words. The *n*-bit extensions, $BI_X$ and $BD_X$, of PSR word 101 extend the address capability to any one of $2^n$ groups of 262,000 word segments of memory. If, as illustrated, *n* is equal to 6, then the address capability of the combination of PSR 100 and PSRE 101 is extended to $2^6 \times 262,000$, or about 16 million words of memory.

It is to be noted that in the register arrangement of FIG. 1, both the BI and BD fields of PSR word 100 and 9 bits in length and therefore capable of identifying 512 different banks of data. In the particular example to be discussed herein, each bank of data is defined as having a granularity of 512 words. Thus the addressing capability of the PSR word 100 is 512 banks of 512 words for a total addressing capability of 262,000 words. With the addition of the extended addressing capability provided by $BI_X$, and $BD_X$ the number of possible banks of data of 512 words is increased to 32,768 banks, or 16,000,000 words.

The contents of the BI and BD fields of the PSR word 100, and the $BI_X$ and $BD_X$ fields of the PSRE word 101, can be derived from and determined by the system shown and described in the aforementioned application Ser. No. 283,596, or alternatively can be determined by the executive program. The BS field of register 100 is adapted to store a value defining the upper limit of the base relative addresses of the instruction segment of addresses. It is to be noted that the data bank of addresses begins at a value greater than the BS value and increase from that point, so that the entire data operand bank of addresses lie above the BS value.

The D-field in PSR words stored in register 100 and 101 contain control bits which perform various functions, some of which are relevant to the present invention and some of which are not. More specifically, in PSR register 100 the control bits 0 – 8 are contained in bit positions 27 – 35 and two additional control bits (D9 and D10) are stored in bit positions 16 and 17. In the PSRE register D-control bits 11 – 19 are contained in stages 12 through 20.

The control bits which relate to the present invention are listed in FIG. 1 and include control bits D–2, D–11, D–12 and D–18.

Control bit D–2 is a guard mode and storage protection bit and, when set, prohibits the main storage from being referenced outside the limits defined by the currently active storage limits register, i.e. the SLR for the PSR currently active. As will be discussed in more detail later herein, each time main storage is referenced for an operand a storage limits test is made and, under certain conditions, if such storage limits test, fails a guard mode bit is examined to determine if it is permissible to reference the computed absolute address outside of the predetermined storage limits. If such access is permissible then the instruction is executed. On the other hand, if referencing the computed operand address outside of said predetermined storage limits is not permitted, than a guard-mode interrupt signal is activated, notifying the processor of an invalid address. Alternatively, under certain conditions the invention provides means for automatically switching to the other PSR to form a new absolute address using the base value contained in said other PSR, and then to make another storage limits test based on the base value contained in the other PSR.

The control bit D–11 is an operand base selector. If D–11 = 0 then the base values from PSR and PSRE are used (assuming D–12 = 0). If D–11 = 1 and the *i* bit from the instruction (FIG. 4) is equal to 1 then the base values from PSRE and PSRUE are used, the jump operand being excluded.

The control bit D–12 is the PSR SLR selector. If D–12 = 1 the PSRU, PSRUE and SLRU are used in forming the aboslute address of the memory location to be referenced. If D–12 = 0 then PSR PSRE and SLR are used.

Control bit D–18 is the automatic switch designator. If D–18 = 1 and a limit error condition exists, then the alternate PSR and SLR are used on the current instruction only. However, on a jump instruction where D–18 = 1 and limit error condition exist, D–12 is toggled from its currently active state to its other state until the next jump occurs under automatic switching conditions. With a non-jump instruction, the switch to the alternate PSR and SLR is effective only for the current instruction and D–12 is not altered.

The cooperation of control bits D–12 and D–18 can be stated more specifically as follows. With D–12 cleared, PSR and SLR are active; with D–12 set, PSRU and SLRU are active. Prior to executing any instruction a limits check is performed with the appropriate SLR or SLRU limits registers. If designator D–18 of the PSR register 101 is not set, execution of the instruction using the currently active PSR and SLR is initiated, even if the limits check fails, but with the proviso that an applicable guard mode designator (D–2) permits the execution of the instruction. However, if D–18 is set and the limits check fails, the alternate (or inactive) PSR and SLR is used and a second limits check is performed. Execution of the instruction using the alternate PSR is dependent upon the results of the second limits check and the state of the applicable guard mode designator. If the instruction being performed is a jump instruction, the designator D–12 is toggled which reverses the active and inactive status of the PSR and PSRU registers until it is again toggled by the occurrence of the next jump instruction in the automatic switching mode. If other than a jump instruction, the designator D–12 is not toggled and the future status of the PSR and PSRU registers remains unchanged.

The reason for the alternating use of the contents of PSR 100 and PSRU 102 registers in forming the absolute address of the next memory reference upon the occurrence of a jump instruction is based on the fact that the instructions and operands comprising a given worker program stored in predetermined memory segments are in sequential order. Hence, it is most likely that the next memory reference will be to the same memory segment as the previous reference. When a jump instruction shifts to a new memory segment, it is desired to continue to make references in that new segment until another jump instruction is encountered. In each instance, however, a storage limits test is made to determine if the next reference is within the boundaries for the segment as determined by the base value contained in the then active PSR or PSRU registers.

I. B. THE PSRU WORD FORMATS OF FIG. 2

Both the PSRU register 102 and the PSRUE register 103 of FIG. 2 are employed to store base values for addressing programs in the main storage of the processor in much the same manner as the PSR register 100 and PSRE register 101 in FIG. 1 are employed. In fact, the PSRU word contained in register 102 and PSRUE word contained in register 103 are alternatives to the words stored in registers 100 101, thereby allowing four directly addressable banks of memory in the processor main storage.

It is to be noted that there are no D fields in the utility adapted to be stored in registers 102 and 103. The D-fields of PSR words adapted to be stored in registers 100 and 101 are sufficient for all necessary control functions.

I.C. THE SLR AND SLRU WORD FORMATS OF FIG. 3

In FIG. 3 there is shown the storage limits register (SLR) 104 and the utility storage limits register (SLRU) 105, which are associated, respectively, with PSR and PSRU registers of FIGS. 1 and 2.

The SLR and SLRU word registers 104 and 105 of FIG. 3 each contain two upper limits and two lower limits. More specifically, for example the SLR word in register 104 contains lower limits for the instruction bank (I-Bank) in bit positions 18 – 26 and upper limits in the bit positions 27 – 35. The SLR word stored in register 104 also defines the lower limits for the data bank (D-Bank) within bit positions 0 – 8, and upper limits in bit positions 9 – 17. The SLRU register 105 is adapted to contain similar upper and lower limits for the I-Bank and the D-Bank.

It is to be noted that the upper and lower limits contained in the SLR and SLRU registers are in terms of the relative address of the instruction operand being tested for limits rather than the absolute address.

I.D. THE INSTRUCTION WORD FORMAT OF FIG. 4

Referring now to FIG. 4 there is shown the format of the computer instruction word. Bit positions 0 – 15 define the u-value, which is utilized in forming the relative operand address of the instructions in conjunction with an *x*-value contained in the index register or X-register 107 of FIG. 5. The *i*-field in the instruction is a one bit field and is employed to determine, in conjunction with bit D–11 of PSRE 101 of FIG. 1, which PSR (PSR 100 or PSRU 102) is to be utilized in referencing a given operand instruction operand. The *a*-field is the index register designator and contains the address of the X-register 107 (FIG. 4), which is one of a plurality of such index registers contained in the general register stack (not shown). The general register stack is merely an array of addressable flip-flop registers providing storage separate from the main or extended memory of the processor.

The *h*-field, the *x*-field, the *j*-field and the *f*-field of the instruction all perform various functions necessary to the operations of the UNIVAC processor but which are not directly relevant to the present invention and therefore will not be described.

The value contained in the *u*-field of the instruction word is added to the *x*-value contained in the selected X-register (FIG. 5) to obtain the relative operand address of the instruction. If $u + x \geq 200_8$, then the operand will lie in the main storage area of the processor. If, on the other hand, $u + x < 200_8$, then the referenced address will lie in the general register stack (not shown).

I.E. THE WORD FORMATS EMPLOYED IN COMPUTING ABSOLUTE ADDRESSES OF INSTRUCTION OPERANDS

Figure 5:
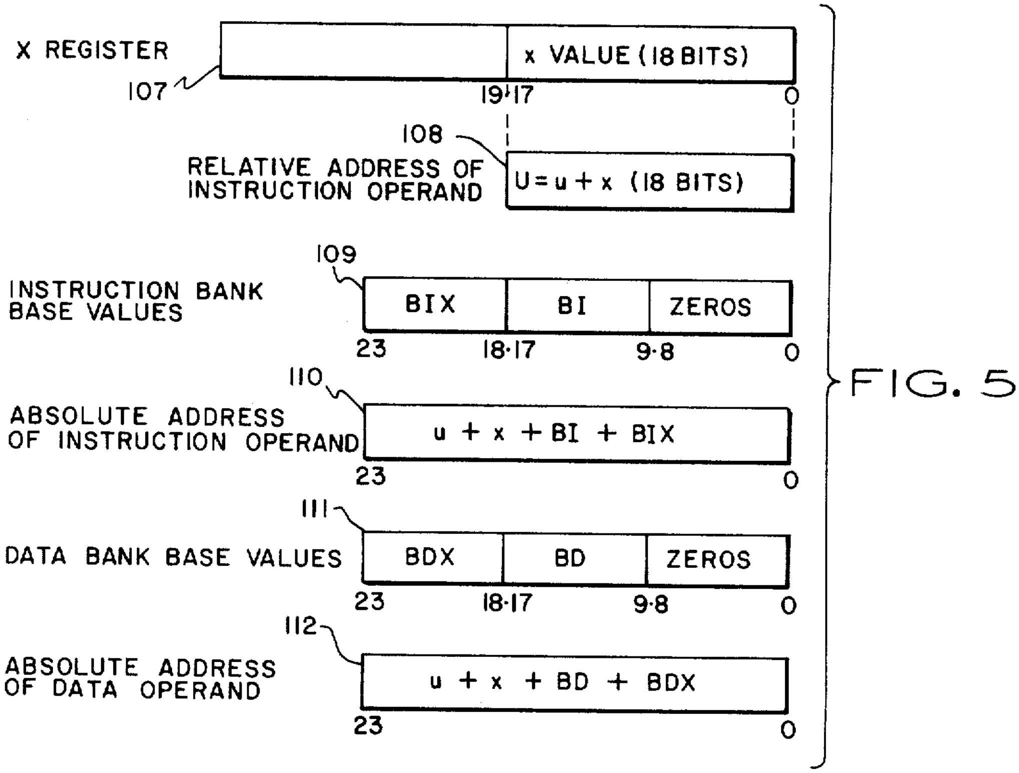
FIG. 5 shows the format of an X-register word and also shows formats of the words or partial words employed in computing the relative and absolute addresses of the instruction operand.

The particular X-register 107 of FIG. 5, which has been identified by the a-field of the instruction word 106 of FIG. 4, contains the *x*-value (index word) in bit positions 0 to 17 thereof. Said *X*-value is added to the *u*-value (operand designator portion) of instruction word 106 in adder means (not shown) to form a new value U. Thus, $U = u + x$ as shown in word format 108 of FIG. 5.

To form the absolute address of the instruction operand, the U-value formed as indicated above must be added to either the BI-value or the BD-value and the corresponding BIX-value or BDX-value. The combining of U and BI or U and BD is shown in formats 110 and 112.

The I-Bank base value is obtained from the PSR and PSRU (depending on which is active at the time) transferred to suitable register means (not shown) and shifted 9 bit positions to the left. Thus, in format 109 of FIG. 5 the values BI and BIX are shown in bit positions 9 through 23 of a 24 bit word format. The first bit positions 0 to 8 contain 0's. The shifting of the base values 9 bit positions to the left before combining them with the U-value in format 108 is necessary because in the preferred embodiment of the system the base values define storage areas with a granularity of 512 address locations and 512 is equal to $2^9$.

The relative address components represented by formats 108 and 109 are then added together in suitable adding logic within the processor to obtain the absolute address of the instruction operand, as shown in format 110 of FIG. 5. Circuitry for adding index and base values to an operand designator portion of an instruction word is fully disclosed in the aforereferenced Ashbaugh et al patent and reference may be made thereto if further detail is deemed necessary.

If the reference is to the D-bank, then the relative address defined by format 108 is added to the D-Bank base values shown in format 111 which are obtained from the active PSR, transferred to a suitable register, and also shifted 9 bit positions to the left as shown in format 111. The shifting of the BD and BDX values 9 bit positions to the left is also due to the 512 word selection granularity. The contents registers 108 and 111 are then added together to produce the absolute address of the data operand as shown in format 112 of FIG. 5. It is to be noted that FIG. 5 merely shows the basic operational steps required to form the absolute address of an instruction operand or a data operand. There is nothing in FIG. 5 to indicate which PSR is the primary PSR. The selection of the primary PSR and the ability to automatically interchange the main PSR and the utility PSRU as the primary PSR forms the essence of this invention. The logic therefor will now be described in detail.

II. GENERAL FUNCTIONAL DESCRIPTION OF OPERATION (FIG. 6)

A. GENERAL DISCUSSION OF FIG. 6

Figure 6:
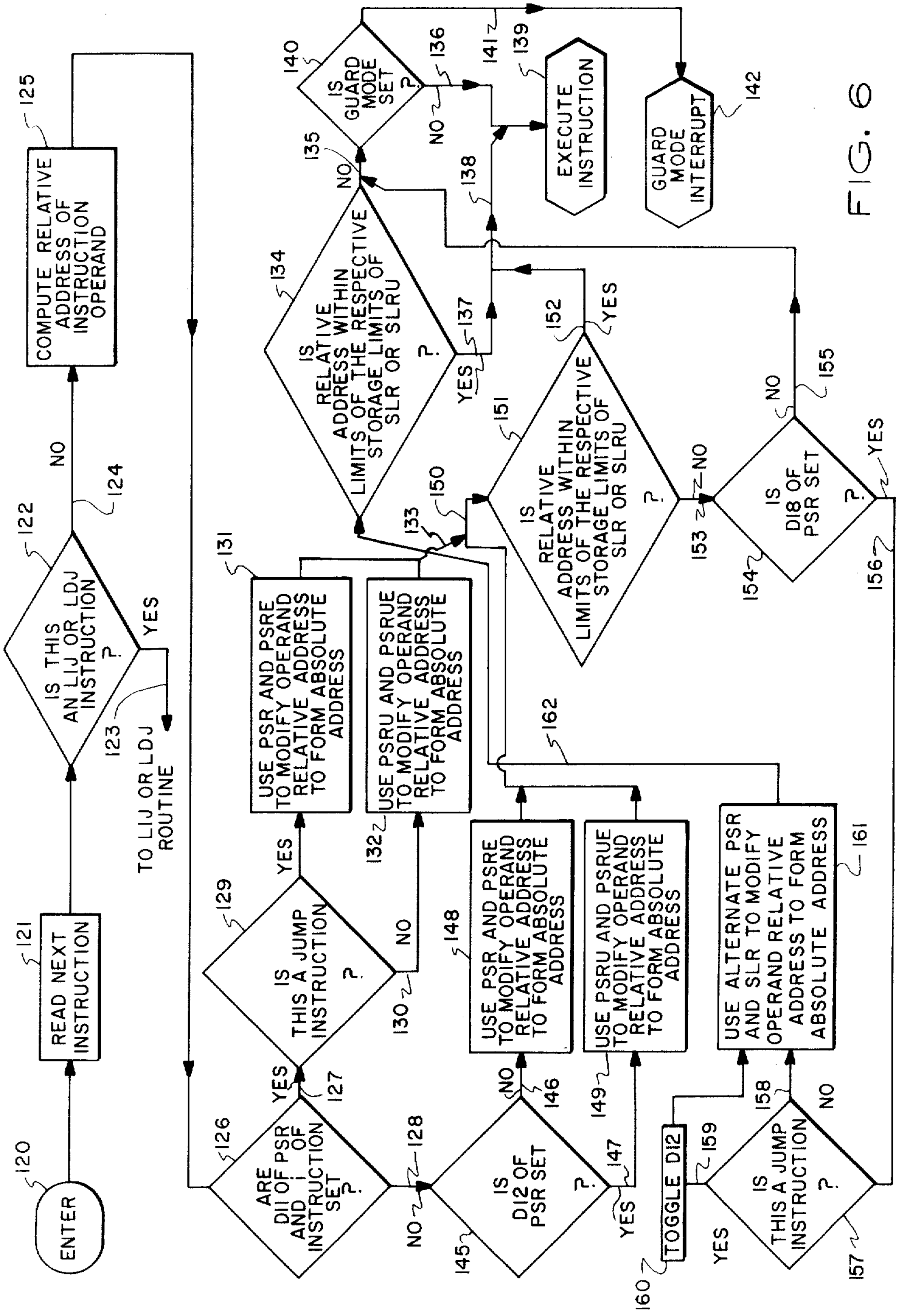
FIG. 6 shows a functional flow-chart of the invention.

Referring now to the flow diagram of FIG. 6, the block 120 represents the entry by the processor into the reading of the next instruction from memory in whatever program the processor may be involved. In block 121 the said next instruction is entered into the instruction register of the computer and is decoded and the function code bits (*f*-field, FIG. 4) are examined and a determination is made as to whether said next instruction is an LIJ or LDJ instruction. This step is represented by symbol 122. As discussed above, LIJ and LDJ type instructions are described in now abandoned application Ser. No. 283,596 and function to change the base address values in either the PSR or the PSRU. If the instruction is an LIJ or LDJ instruction, it is executed as represented by the legend on line 123.

However, if it is not an LIJ or LDJ instruction, the next step in the sequence is to compute the relative address of the instruction or data operand in accordance with the formats of FIG. 5 and in the manner described hereinbefore. This operation is represented by block 125 in FIG. 6.

Next, in the logic block 126 a determination is made as to whether control bit D–11 of the primary PSR and the *i* bit of the instruction word are both set. If such bits are both set, then the decision indicated by block 129 is made. But if both D–11 and the *i* bit are not set, then the decision represented by block 145 is made. It is to be noted that if both control bits D–11 and *i* are set then, by convention, the instruction is in the executive program.

At this point in the discussion of FIG. 6 it should be noted that the logic of the system can follow one of two major branches or paths. The first major branch is through jump determination logic 129, absolute address computing logic 131 or 132, and then continue to the primary storage limits verification of logic 151. The second major branch or path follows logic blocks 145, absolute address computing logic 148 or 149, limit test logic 151, and then either to execute instruction logic 139 or alternatively through the logic blocks 154, 157 and 160 to block 161 which automatically switches PSR's and computes the absolute address using the new PSR. From block 161 the logic flows to limits test logic 134 and directly to execute instruction logic 139 or alternatively to guard mode logic 140. From guard mode logic 140 the logic flows to execute instruction logic 139 or to guard mode interrupt logic 142.

The principal difference between the two main branches outlined briefly above is as follows: The first branch or path is always followed when the control bit D–11 of PSRE 101 and the i bit of the instruction word are both set. The determination of which PSR is primary, i.e., PSR or PSRU, is determined entirely by whether the instruction is a jump instruction or not. Further, as noted above, only executive instructions can follow the said first path and only then when both control bit D–11 and *i* are set.

The second path can be entered into by either an executive instruction or a user program instruction and does contain the mechanism for automatic switching between PSR and PSRU as the primary PSR if a storage limits test fails. Both paths will alternate PSR use if control bit D–18 is set as indicated in the dicision block 154.

In discussing the flow diagram of FIG. 6, the first main path will be described first. Then the second main path will be described in detail. Following a description of the two main logic paths of FIG. 6 the circuit diagram of FIG. 7 used to implement the functions depicted by FIG. 6 will be described.

II. B. DISCUSSION OF FIRST MAIN LOGIC BRANCH

Assuming that control bits D–11 and *i* are both set, a test is made of the *f*-designator of the instruction word to detect whether the instruction is a jump class instruction as represented by symbol 129. If the instruction is not a jump instruction then the flow diagram indicates that the operation represented by block 132 is performed wherein the PSRU and the PSRUE are employed to modify the operand relative address previously computed as represented by block 125, to form the absolute address of the operand.

If the instruction had been a jump instruction, then the contents of the PSR and PSRE are employed to modify the operand relative address previously computed as represented by block 125, to form the absolute address thereof.

The absolute address computed as a result of the operations suggested by block 131 or 132 is then compared to the limits established by the contents of the applicable SLR or SLRU register to determine whether it is within the boundaries established.

II. C. DISCUSSION OF SECOND MAIN LOGIC BRANCH

Referring still to FIG. 6, if both control bits D–11 and *i* are not set a test, represented by block 145, is made to determine whether control bit D–12 is set. If D–12 is not set the I-Bank or D-Bank values in PSR and PSRE are added to the operand relative address previously computed, to form the absolute address thereof as indicated by block 148. On the other hand, if D–12 is set the corresponding values stored in PSRU and PSRUE are used to modify the operand relative address to form the absolute address thereof. (See block 149 - FIG. 6.)

It is to be noted that the operations symbolized by blocks 148 and 149 are the same as those symbolized by blocks 131 and 132 in FIG. 6. As will be explained in connection with FIG. 7, the same control circuitry is used to perform the functions represented by blocks 148 and 149 and blocks 131 and 132.

Following the generation of the absolute address in accordance with the operations suggested by blocks 148 or 149 a storage limits check is made. The component of the operand relative address employed in forming the absolute address is compared with the boundaries defined by the contents of SLR or SLRU to determine if said relative address falls within the limits set forth in SLR or SLRU. This compare operation is indicated by block 151 in FIG. 6. If the relative address does fall within such limits then the current instruction is executed (Symbol 139) and the operand is fetched from the memory segment defined by the absolute address.

Alternatively, if the storage limits test fails than a test is made to determine whether control bit D–18 of the main PSR is set. If D–18 is not set, the guard-mode bit D–2 is again examined. (See Symbol 149.) If the guard-mode bit is not set, then the failure of the storage limits test can be ignored and the instruction can be executed as previously described. If the guard-mode bit is set then an interrupt signal is generated as represented by Symbol 142 and control is transferred to a predetermined address which is the starting address of the so-called guard-mode interrupt routine.

Referring back to block 154, if the control bit D–18 is set a determination is made as to whether the instruction in question is a jump class instruction. If it is not a jump instruction, then the control circuits of FIG. 7 function to automatically switch PSR's, i.e., make the heretofore currently active PSR and LSR inactive and to make the alternate PSR, heretofore inactive, the active PSR for computing the absolute address of the operand. This operation is represented in FIG. 6 by block 161. Note that if the instruction is not a jump instruction the alternate PSR and SLR are only employed for that particular instruction. The next instruction will again use the immediately previously active PSR and SLR words.

However, if the instruction is a jump instruction control bit D–12 is toggled to its other state (block 160), thereby making the change of PSR permanent until another jump instruction occurs. After toggling control bit D–12, the alternate heretofore inactive PSR and SLR are employed to modify the operand relative address to form the absolute operand address. It is to be specifically noted that whether the instruction is a jump instruction or not, the alternate, heretofore inactive PSR and SLR will be employed for address modification. The control logic is constructed in such a manner that even though the D–12 control bit is toggled to its other position to make a permanent change in primary PSR's, such toggling will not occur until after the operation indicated by block 161 has been accomplished. Thus, if the current previously active PSR had been the main PSR then, whether or not the current instruction was a jump, the alternate PSR, e.g., the PSRU, will be employed for modifying the current instruction. If, however, the said current instruction was a jump, then switch control bit D–12 will be toggled so that all subsequent instructions will employ PSRU and SLRU until another jump instruction occurs.

Figure 7:
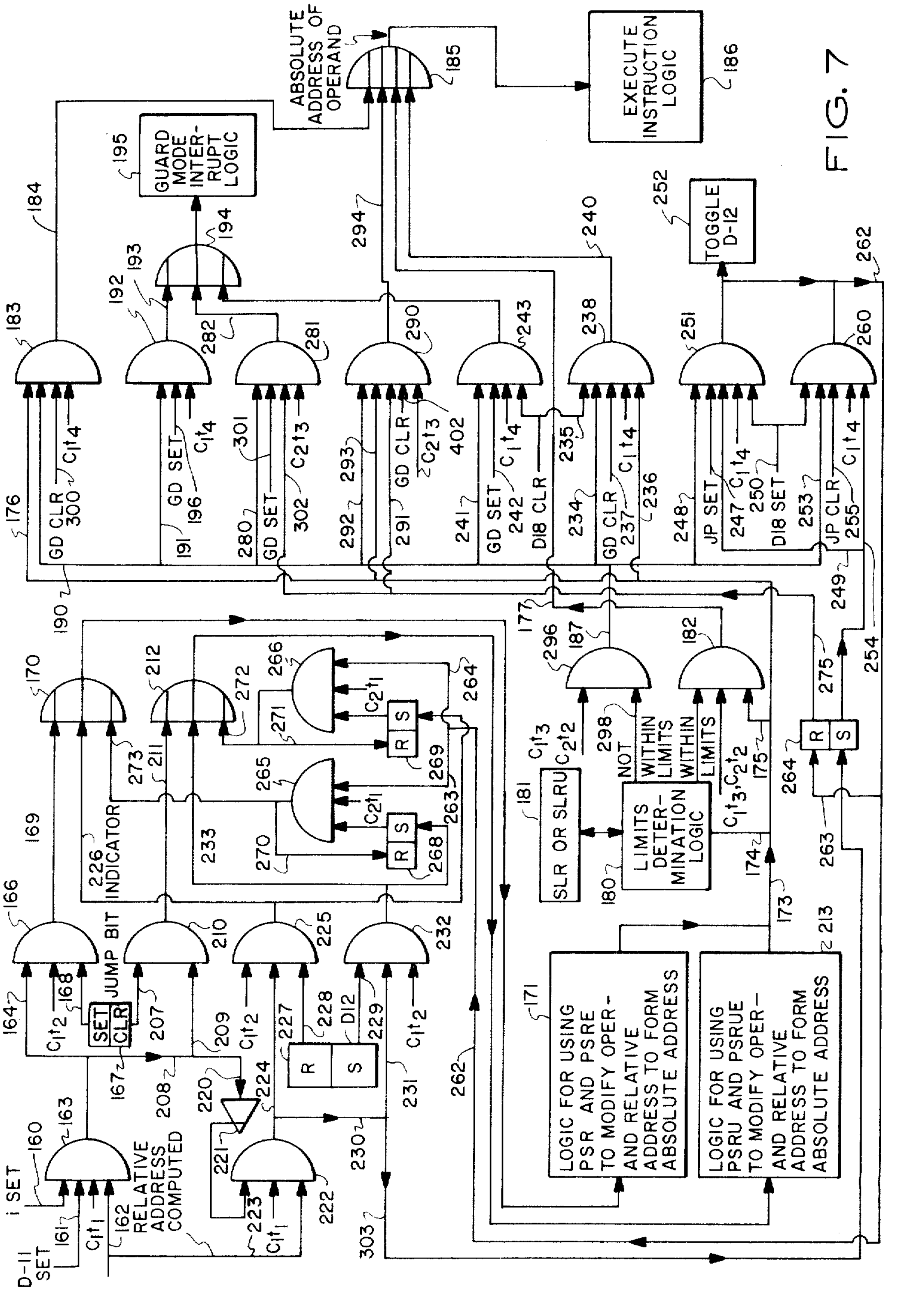
FIG. 7 shows a logic diagram of the control circuits for implementing the functions shown in FIG. 6.

The modification of the operand address indicated by block 161 employs the same control circuitry in FIG. 7 as is used to carry out the operations represented by blocks 148, 149, 131 and 132 in FIG. 6. Following the generation of the absolute address as suggested by block 161, a storage limits test is made of the relative address component of this absolute address. If such relative address is within the indicated limits, the instruction execution steps will be completed in a normal fashion.

Alternatively, if the storage limits test fails, the guard-mode bit is checked (block 140). If the guard-mode bit is not set, then the operand can be referenced in main storage even though its address lies outside the limits of the SLR word. If the guard-mode bit is set then a guard-mode interrupt signal is generated indicating the storage limits failure.

III. DESCRIPTION OF IMPLEMENTING LOGIC OF FIG. 7

Now that the functioning of the autoswitch control of this invention has been fully described, attention will be given to the circuitry or hardward used to implement these functions.

In discussing FIG. 7 that portion thereof which is used to implement the first major branch of the flow chart of FIG. 6 will be described first; followed by a discussion of the logic required to implement the second major path of FIG. 6. Further, many of the AND gates of FIG. 7 have clock input leads. In describing FIG. 7 the occurrence of clock pulses will not be specifically mentioned. It will be assumed that a proper timing pulse has occurred if the description states that a given AND gate has been enabled.

In section III–C of the specification a timing chart is set forth showing the order of occurrence of the timing pulses and stating the gates affected thereby.

III. A. DISCUSSION OF LOGIC OF FIG. 7 FOR IMPLEMENTING FIRST MAIN LOGIC BRANCH OF FIG. 6

In FIG. 7 it is assumed that the relative operand address, U, has been computed by summing the u-designator of the current instruction word with the contents of an index (X) register specified by the X-designator of the instruction word and an indication thereof supplied to AND gate 163 via input lead 162. It is further assumed that both the control bit D–11 of the active PSR and *i* of the instruction are set so that binary 1's are supplied to the remaining two inputs 160 and 161 of AND gate 163. AND gate 163 is thereby enabled to supply a 1 to input 164 of AND gate 166 and to input 209 of AND gate 210.

Flip-flop 167 represents a jump bit indicator and is responsive to an output from the instruction's function code translator (not shown). If the jump bit indicator flip-flop is clear input 207 to AND gate 210 is enabled, and input 168 to AND gate 166 is a 0, thereby disabling AND gate 166. The output of enabled AND gate 210 will then be supplied through OR gate 212 and into logic block 213, which responds thereto to modify the operand relative address to form the absolute address thereof by using the base values in the PSRU and PSRUE. As mentioned above, the circuitry for implementing logic block 213 is a conventional binary parallel adder with associated input gates and it is not considered necessary to set forth circuitry for it in detail. The absolute address produced logic 213 is then supplied via cable 173 to several possible destinations. These possible destinations include a limit determining means 180, which can be a conventional greater-than/less-than compare circuit, via cable 174, AND gate 182 via cable 175, AND gate 183 via cable 176, AND gate 238 via cable 236 and AND gate 290 via cable 293. Depending on the settings of various designators and the results of the limits test, the absolute address will be supplied through one of the aforementioned AND gates 182, 183, 238 or 290 to the execute instruction logic 186 via OR gate 185, as will be discussed later herein.

Returning again to AND gates 166 and 210, assume that the jump bit indicator flip-flop 167 is set so that AND gate 166 is enabled and AND gate 210 is disabled. The output of AND gate 166 will then pass through OR gate 170 into the binary adder logic 171 which will respond thereto to sum the operand relative address with the base values in PSR and PSRE to form the absolute address. PSR and PSRE constitute the primary PSR when AND gate 166 is enabled. The absolute address generated by adder logic 171 is then supplied via cable 173 through the same path as we described immediately above with respect to the absolute address generated by the logic block 213.

The foregoing logic implements, generally, function blocks 129, 131 and 132 of FIG. 6.

III. B. DESCRIPTION OF LOGIC OF FIG. 7 FOR IMPLEMENTING SECOND MAIN LOGIC BRANCH OF FIG. 6

If either one of the control bits D–11 or *i* is not set then the output of AND gate 163 will be a 0 which, when supplied through inverter 221 via paths 208 and 220, will supply a conditioning 1 to one input of AND gate 222, partially enabling same. Then, when a signal from the processor's control circuits indicating the completion of the computation of the operand relative address, i.e., $u + x$, occurs on input leads 162 and 223, AND gate 222 will be enabled to supply an enabling 1 to inputs 224 and 231 of AND gates 225 and 232. In accordance with the setting of control bit D–12, represented by flip-flop 227, one of AND gates 225 or 232 will be fully enabled and the other disabled. Assume at this point that control bit D–12 is reset so that AND gate 225 is enabled. The output from AND gate 225 is supplied via lead 226 through OR gate 170 to enable the adder logic 171 which will respond thereto to compute the absolute address of the operand by adding to $u + x$ the values in PSR and PSRE.

On the other hand, if D–12 is set then AND gate 225 will be disabled and AND gate 232 will be enabled. In such an event the output of AND gate 232 will be supplied via path 233 through OR gate 212 and into adder logic 213. Logic block 213 will respond thereto to complete the computer the absolute address of the operand using the PSRU and PSRUE word, as previously described. The computed absolute address, whether formed by using the base values in PSR or PSRU, will be supplied via cable 173 into the limits determining comparator logic 180 where it will be compared with the limits in the appropriate SLR or SLRU register 181.

If the limits test succeeds then an indication thereof will be supplied to AND gate 182 so that the aboslute address will be transferred through AND gate 182 from its input cable 175 to its output cable 177 and then through OR gate 185 into execute instruction logic 186. If the limits test fails, then an output indicating such failure will be supplied from logic block 180 through lead 298, AND gate 296, lead 187 to AND gates 183 and 192. Accordingly, neither AND gate 183 or AND gate 192 can be fully enabled. But the not-within limits signal from logic 180 is also supplied to AND gates 243, 238, 251 and 260 via common leads 187 and 190 and then via individual leads 241, 234, 248 and 253, respectively.

When in a cleared condition the control bit D–18 supplies a 1 to other inputs of AND gates 243 and 238 via inputs 235. When in a set condition, the control bit D–18 supplies a 1 to inputs 250 of AND gates 251 and 260, respectively. Assume first that control bit D–18 is in a reset condition. Under these circumstances either AND gate 243 or 238 will be enabled depending upon whether the guard-mode bit is set or cleared. If the guard mode bit is cleared then there will be a 1 supplied to input lead 237 of AND gate 238, thereby enabling AND gate 238 and allowing the computed absolute address to pass from input cable 236 through AND gate 238 to output cable 240 and then through OR gate 185 into execute instruction logic 186.

On the other hand, if the guard-mode bit is set than a 1 is supplied to input lead 242 of AND gate 243 so that AND gate 243 is fully enabled, thereby providing an output on lead 294 which passes through OR gate 194 into the guard-mode interrupt logic 195. It is to be noted that when the guard-mode bit is set and AND gate 243 is thereby enabled, the AND gate 238 is disabled since the guard-mode input lead 237 will have a 0 supplied thereto.

Assume now the case where the control bit D–18 is set. Under this condition the AND gates 243 and 238 cannot be enabled. However, one or the other of AND gates 251 or 260 can be enabled, depending on whether the jump bit indicator is set or clear. If the jump bit indicator is clear then there is a 1 on input lead 255 of AND gate 260 to enable said AND gate 260 and thereby supply a 1 on output lead 262. If the jump bit indicator is set then there is a 1 supplied to input lead 247 of AND gate 251 which is thereby enabled to supply an output both to the output lead 262 and also to the logic block 252, which functions to toggle the control bit D–12. Thus it can be seen that as long as the D–18 control bit is set that there will be an output produced on the output lead 262 since either AND gate 251 or 260 will be enabled.

The switching of the control bit D–12 is accomplished if the instruction is a jump for the reasons set forth above in connection with the discussion of the function blocks 157 and 160 of FIG. 6.

The indicating signal supplied to output lead 262 from AND gate 251 or AND gate 260 is supplied back to an input of AND gates 265 and 266. The output on lead 262 is also supplied via lead 263 to reset flip-flop 264. The flip-flop 264 is normally in a set condition so as to enable AND gates 251 and 260 and to inhibit AND gates 281 and 290. However, when flip-flop 264 is in a reset condition the AND gates 251 and 260 are inhibited so that they cannot be enabled even though control bit D–18 is set. The reason for inhibiting AND gates 251 and 260 is to avoid the logic going into a repetitive loop condition in the event that the limits test fails with the use of both the PSR and PSRU words while operating in the second main logic branch.

Consider now the function of the flip-flops 268 and 269. One of these two flip-flops was set at the time that one of the two AND gates 225 or 232 became enabled. More specifically, flip-flop 268 was set when AND gate 232 was enabled and flip-flop 269 was set when AND gate 225 was enabled. The setting of flip-flop 268 or flip-flop 269 conditions, AND gate 265 or AND gate 266, respectively, so that it will become enabled when the output from either AND gates 251 or 260 is later supplied to input lead 263 of AND gates 265 and 266 via lead 262.

It will be noted that one and only one of the AND gates 265 or 266 will thus become fully enabled by the output appearing on lead 262. Also note that the output of AND gate 265 is supplied to the adder logic 171 through OR gate 170 whereas the output of its enabling AND gate 232 is supplied to adder logic 213 through OR gate 212. Similarly, the output of AND gate 266 is supplied to adder logic 213 through OR gate 212 whereas the output of its enabling AND gate 225 is supplied to adder logic 171 through OR gate 170. Thus the AND gates 265 and 266 function to select the alternate PSR from the PSR that was utilized the first time the absolute address was computed in the adder logic blocks 171 or 213. As for example, if the first computation of absolute address is done in adder logic 171 as a result of enablement of AND gate 225 and the limits test subsequently fails, then the resultant output signal supplied from AND gate 251 or 260 through the lead 262 will enable adder logic 213 via lead 264, AND gate 266 and OR gate 212 so that PSRU will be utilized to compute the new absolute address the second pass through the logic. The new absolute address thereby computed will be supplied via lead 173 back into the limits determination logic 180 where it will be compared with the limits in SLRU 181. If the limits test is successful, then the computed absolute address is passed through AND gate 182, lead 177 and OR gate 185 into the execute instruction logic 186.

If the address is not within the limits of SLRU, than a signal is supplied from logic 180 to lead 298, AND gate 296, lead 187, lead 190 and then via leads 280 and 292 into AND gates 281 and 290. Since flip-flop 264 is at this time in a reset condition, there is a 1 on input leads 302 and 291 of AND gates 281 and 290.

If the guard-mode bit is set then there is also a 1 on input lead 301 of AND gate 281 so that AND gate 281 is enabled. An output is supplied from AND gate 281 through output lead 282, OR gate 194 and to guard-mode interrupt logic 195.

Alternatively, if the guard mode bit is clear, then there is a 1 on lead 302 and AND gate 290 is enabled, thereby supplying output through lead 294 and OR gate 185 to execute interrupt logic 186.

It is to be noted that none of the four AND gates 243, 238, 251 and 260 can be enabled by the (not-within-limits) output from comparator logic 180. More specifically, AND gates 251 and 260 are disabled by the clear condition of flip-flop 264 and AND gates 243 and 238 are disabled by the set condition of control bit D–18.

Upon the occurrence of the next output from AND gate 222, which represents the next instruction passing into the second main logic path of the system, the flip-flop 264 will be set via lead 303. If either flip-flop 268 or 269 becomes set it will become reset when its associated AND gate 265 or 266 supplies an output therefrom, thus always returning said flip-flops 268 and 269 to a reset condition for subsequent setting by an output from AND gate 225 or 232.

III. C. GENERAL DESCRIPTION OF TIMING CHART OF FIG. 8

Figure 8:
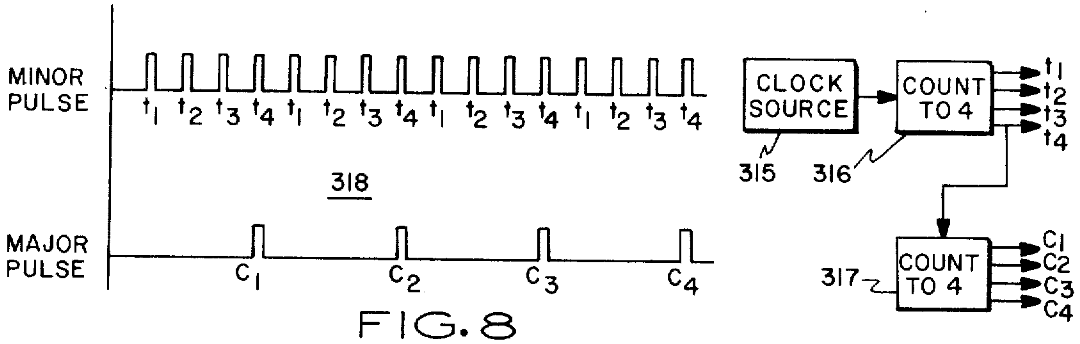
FIG. 8 illustrates the basic timing employed in the invention.

Referring now to FIG. 8 there is shown a timing means consisting of a clock source 315 which may be a free-running oscillator of conventional design, a first counter 316 and a second counter 317. Both counters 316 and 317 count to 4 and thus, in effect, divide by 4. More specifically, the counter 316 produces a series of four output pulses $t_1$, $t_2$, $t_3$, $t_4$, identified herein as minor clock pulses. The minor clock pulse output $t_4$ is supplied to counter 317 which in turn produces four major clock pulses $C_1$, $C_2$, $C_3$, $C_4$. One of such major clock pulses is produced for every four minor clock pulses. Timing diagram 318 of FIG. 8 shows the time relationship between the minor and major clock pules.

The minor and major clock pulses are employed in the logic diagrams of FIG. 7 to control the sequence of events. Thus, for example, upon the occurrence of clock pulse $C_1t_1$ the AND gate 163 is enabled. At the next minor clock pulse $C_1t_2$ either AND gate 166 or AND gate 210 is enabled.

The following chart shows the entire sequence of events occurring in the logic diagram of FIG. 7 during the complete operation of the invention.

It is to be noted that in the logic diagram of FIG. 7 much of the usual logic required to effect gating by means of timing signals is omitted. It is to be understood, however, that conventional gating logic will be employed in an actual design.

TIMING FOR FIRST MAIN LOGIC BRANCH

| | |
|---|---|
| $C_1t_1$ | Enable AND gate **163**. |
| $C_1t_2$ | Enable AND gate **166** or **210** and modify operand relative address to form absolute addresses in adder networks **171** or **213** |
| $C_1t_3$ | Enable AND gate **182** or **296** in response to storage limits check in limit determining logic **180** and SLU **181**. |
| $C_1t_4$ | Enable AND gate **183** or **192** to activate execute instruction logic **186**, or guard mode logic **195**. |

TIMING FOR SECOND MAIN LOGIC BRANCH

| | |
|---|---|
| $C_1t_1$ | Enable AND gate **222**. |
| $C_1t_2$ | Enable AND gate **225** or **232** and modify operand relative address to form absolute addresses in blocks **171** or **213**. |
| $C_1t_3$ | Enable AND gate **182** or **296** in response to storage limits check in limit determining logic **180** and SLU **181**. |
| $C_1t_4$ | Enable one of AND gates **243**, **238**, **251** or **260** to execute instruction logic **186**, activate guard-mode logic **195** or go into automatic PSR switching branch. |
| $C_2t_1$ | Enable AND gate **265** or **266** to modify operand relative address, using alternate PSR to form absolute addresses, in adder networks **171** and **213**. |
| $C_2t_2$ | Enable AND gate **182** or **296** in response to storage limits check in limit determining logic **180** and SLU **181**. |
| $C_2t_3$ | Enable AND gate **281** or **290** to activate execute instruction logic **186** or guard mode logic **195**. |

It is to be understood that the form of the invention shown and described herein is but a preferred embodiment thereof and that various changes may be made in logic arrangement and in logic elements employed without departing from the spirit or scope thereof.

What is claimed is:

1. In a data processing system employing base relative addressing and two processor state registers (PSR), including a main processor state register (PSRM) and a utility processor state register (PSRU), with each PSR containing at least one base value pointing to a bank in main storage, and with one of said PSR's acting as the primary (active) PSR for the computation of absolute addresses of instruction operands at any given time and the other PSR acting as the alternate (inactive) PSR at said given time, and further employing first and second storage limits registers (SLR's) containing first and second predetermined storage limits, usable respectively with said first and second PSR's; a method for automatically switching the states of activity of the two PSR's in response to a determination that the relative address of an operand of a given instruction falls outside predetermined storage limits and comprising the steps of:

computing the relative address of the operand;

determining that a given PSR is the primary PSR and that the other PSR is the alternate PSR;

modifying said operand relative address with the base value of the primary PSR to form a first absolute address of said instruction operand;

determining whether the operand relative address falls outside said predetermined storage limits usable with said given PSR;

modifying, for a second time, said operand relative address with the base value of said alternate PSR to form a second asolute address of said instruction operand when said operand relative address falls outside said predetermined storage limits;

again determining if said operand relative address falls outside predetermined storage limits usable with said other PSR; and executing said given instruction in response to a determination that said operand relative address falls inside said second predetermined storage limits.

2. In a data processing system employing base relative addressing and first and second processor state registers (PSR's) with each PSR containing at least one base value pointing to a bank in main storage, and with one of said PSR's acting as the primary (active) PSR for the computation of absolute addresses of instruction operands at any given time and the other PSR acting as the alternate (inactive) PSR at said given time and further employing first and second storage limits registers (SLR's) containing first and second predetermined storage limits, usable respectively with said first and second PSR's; a method for automatically switching the states of activity of the two PSR's in response to a determination that the absolute address of an operand of a given instruction falls outside predetermined storage limits and comprising the steps of:

determining that a given PSR is the primary PSR and that the other PSR is the alternate PSR;

computing a first absolute address of the operand of said given instruction using the base value of the primary PSR;

determining whether said first computed absolute address falls outside the predetermined storage limits usable with said PSR;

determining if said given instruction is a jump instruction;

interchanging the activity status of said PSR's in response to a determination that said instruction is a jump instruction to make said other PSR the active PSR and said given PSR the inactive PSR for all subsequent instructions until the occurrence of another jump instruction having an operand whose absolute address falls outside predetermined storage limits;

recomputing an aboslute address of the operand for said given instruction using the base value of said other PSR, in response to a determination that said first computed absolute address falls outside the predetermined storage limits usable with said first PSR;

determining whether said second absolute address falls outside predetermined storage limits usable with said other PSR; and executing said given instruction in response to a determination that said second absolute address falls inside said second predetermined storage limits.

3. In a data processor system having a main storage and employing base relative addressing the combination comprising:

a first processor state register (PSR);

a second processor state register (PSR);

each of said PSR's containing a base address value used for computing absolute addresses of instruction operands;

first control means connected to a predetermined stage of said first processor state register for determining that a given one of said first or second PSR's shall be the active PSR at any given time and that the other PSR shall be inactive at said given time;

means for computing the relative address of the operand of a given instruction;

adding means for combining the base address value of said given PSR with said relative address to form the absolute address of said given instruction operand;

comparing means connected to receive the relative address component of said absolute address for determining whether said operand relative address lies within a predetermined range of values;

control means responsive to the comparing means to automatically combine the base address value of said other PSR with said relative address to form the absolute address of said given instruction operand when said comparing means determines that said relative address component lies outside said predetermined range of values; and said control means further including means responsive to the determination that the operand relative address component of a jump instruction lies outside said predetermined range of values to permanently and automatically cause said other PSR to become the active PSR until the occurrence of another jump instruction having an operand relative address outside of said predetermined range of values.

4. In a digital data processing system of the type including a memory for storing programs of instructions and operands at addressable locations therein, an address generating control means for generating the absolute address of a word to be accessed in said storage device comprising:

an instruction register for at least temporarily holding an instruction word during decoding thereof, said instruction word comprising a plurality of designator fields including an operation code field, a relative address field and an indirect addressing designator field;

an acitve and an inactive processor state register for storing in each first and second base values;

a first sensing means connected to said instruction register for sensing said indirect addressing designator field and said operation code field; and logic means responsive to an output of said first sensing means for combining the base value in said active processor state register with the contents of said relative address field in forming said absolute address when said indirect addressing designator field and said operation code field are of a first binary significance and for combining the base value in said previously inactive processor state register with the contents of said relative address field in forming said absolute address when said indirect addressing designator field or said operation code field are of a second binary significance.

5. The address generating control means as in claim 4 and further including:

a second sensing means connected to a first predetermined state of one of said processor state registers and connected to said logic means for combining the base value in said active processor state register with the contents of said relative address field in forming said absolute address when said indirect addressing designator field and said first predetermined stage are of said second binary significance.

6. The address generating control means as in claim 5 and further including:

storage limits register means for storing binary signals indicative of boundary values of ranges of addresses in said memory;

means for comparing the relative address component of said absolute address with the contents of said storage limits register means; and means connected to said comparing means for reversing the activity state of said processor state registers such that in recomputing said absolute address, the contents of the previously inactive processor state register is combined with the contents of said relative address field only when said relative address component lies outside of said boundary values.

7. The address generating control means as in claim 6 and further including:

toggling means responsive to said first sensing means for switching the binary state of said first predetermined stage of said one of said processor state registers each time said first sensing means detects the presence of a jump class instruction in said instruction register and said relative address component lies outside of said boundary values.

8. The address generating control means as in claim 7 and further including:

means for disabling said toggling means when a second predetermined stage of said one of said processor state registers is of a first binary significance.

* * * * *

UNITED STATES PATENT OFFICE
CERTIFICATE OF CORRECTION

Patent No. 3,815,101 Dated June 4, 1974

Inventor(s) Garold D. Boss et al.

It is certified that error appears in the above-identified patent and that said Letters Patent are hereby corrected as shown below:

On the title page in listing of "Attorney, Agent, or Firm" change "Kenneth J. Grace" to -- Thomas J. Nikolai --. Column 18, line 62, "state", first occurrence, should read -- stage --.

Signed and sealed this 5th day of November 1974.

(SEAL)
Attest:

McCOY M. GIBSON JR.
Attesting Officer

C. MARSHALL DANN
Commissioner of Patents

M PO-1050 (10-69)

USCOMM-DC 60376-P69
U S GOVERNMENT PRINTING OFFICE 869-930